United States Patent [19]

Arndt et al.

[11] Patent Number: 5,895,442

[45] Date of Patent: Apr. 20, 1999

[54] METHOD FOR MAKING COORDINATE MEASUREMENTS ON A WORKPIECE

[75] Inventors: Thomas Arndt; Henrik Herklotz, both of Berlin, Germany

[73] Assignee: Carl-Zeiss-Stiftung, Heidenheim, Germany

[21] Appl. No.: 08/731,739

[22] Filed: Oct. 18, 1996

[30] Foreign Application Priority Data

Oct. 20, 1995 [DE] Germany .................. 195 39 148

[51] Int. Cl.⁶ .................................. G01B 5/008
[52] U.S. Cl. .................................. 702/95; 702/85
[58] Field of Search .................. 33/1 M, 501, 503, 33/505, 700, 702; 364/474.37, 556–560, 571.01, 571.02, 571.04, 571.05, 571.07; 702/85–94, 95, 127, 150, 152

[56] References Cited

U.S. PATENT DOCUMENTS

| 4,333,238 | 6/1982 | McMurtry | 33/504 |
| 4,796,195 | 1/1989 | Haggerty | 364/474.35 |
| 4,819,195 | 4/1989 | Bell et al. | 364/571.05 |
| 4,991,304 | 2/1991 | McMurty | 33/505 |
| 5,471,406 | 11/1995 | Breyer et al. | 364/559 |
| 5,594,668 | 1/1997 | Bernhardt et al. | 364/571.07 |

FOREIGN PATENT DOCUMENTS 0638781 2/1995 European Pat. Off. .
2045437 10/1980 United Kingdom .
WO 88/09915 12/1988 WIPO .

OTHER PUBLICATIONS

"Die Prüfung der Messgerätegenauigkeit mit dem Kreisformtest" by W. Knapp, Technische Rundschau, vol. 77, No. 42, Oct. 1985, Bern, Switzerland, pp. 12 to 20.

Primary Examiner—John E. Barlow, Jr.
Assistant Examiner—Craig Steven Miller
Attorney, Agent, or Firm—Walter Ottesen

[57] ABSTRACT

The invention is directed to a method wherein measured values are mathematically combined with stored corrective values. The measured values are determined during the form measurement on circularly-shaped, cylindrical or spherically-shaped geometric elements by a coordinate measuring apparatus. To determine these corrective values, circularly-shaped or circular-segment shaped measurement lines each having several different diameters are scanned at different speeds in several positions or planes of the coordinate measuring apparatus. The form deviations corresponding to the diameters and the speeds which are measures on the known form are stored. In addition to the variables of diameter and scanning speed, the corrective values can be parameterized in accordance with the wavelength constant of the filter used, the position in the measuring region and peripheral direction of the measurement.

20 Claims, 2 Drawing Sheets

METHOD FOR MAKING COORDINATE MEASUREMENTS ON A WORKPIECE

FIELD OF THE INVENTION

The invention relates to a method for making coordinate measurements on a workpiece with a coordinate measuring apparatus wherein the determined measured values are mathematically combined with stored corrective values.

BACKGROUND OF THE INVENTION

To increase the precision of coordinate measuring apparatus, it has been known for some time to provide the measuring results with computed corrections. The measuring results are the coordinate measuring values which are supplied by the scales in the measurement axes of the apparatus. An overview of different corrective methods, which are utilized for this purpose, are disclosed, for example, in U.S. Pat. No. 5,594,668, incorporated herein by reference. In this patent, errors are corrected which are caused by the dynamic deformation of the structure of the apparatus because of the acceleration of the measurement sleds and the mass inertia of the moved parts. Even though the measurement errors of the apparatus are substantially reduced with the above-described corrective methods and the measurement accuracy is significantly increased, there still remain, with respect to specific tasks, residual errors which cannot simply be neglected.

For example, and because of the improved capability of individual system components, coordinate measuring apparatus are presently used increasingly also to make form measurements and to determine position features on circularly-shaped and cylindrically-shaped geometric elements. However, the unreliability of the measurement for the determination of form deviations with a coordinate measuring apparatus is still considerably greater than for conventional form measuring apparatus for circular forms, cylindrical forms and spherical forms. The reasons are essentially associated with the measuring system dynamic and the apparatus dynamic. Residual errors which can hardly be corrected or can be corrected only with considerable effort are also reasons causing the unreliability in measurements. The residual errors result from the dynamic of the displacement movements of the measurement sleds of the coordinate measuring apparatus. Errors having a maximum second order and which are caused by centrifugal force are described in the above-mentioned U.S. Pat. No. 5,594,668. In addition to these errors, errors of higher orders occur such as drag errors, vibrations of the controller which is intended to hold the measuring force constant et cetera. These errors are systematic and reproducible but cannot be described by a simple mathematical relationship. In addition, the error performance of the apparatus during its service life can change, inter alia, because of changing thermal influences, mechanical stress and wear as well as because of changes of the characteristic lines of the electronic components in the control and the drives of the apparatus such as after an exchange of such components.

SUMMARY OF THE INVENTION

In view of the above, it is an object of the invention to provide a method for making coordinate measurements on a workpiece wherein the above-mentioned residual errors are eliminated in order to further increase the measuring accuracy of a coordinate measuring apparatus when making form measurements of circularly-shaped, cylindrical and spherically-shaped geometric elements.

The method of the invention is for making coordinate measurements on a workpiece with a coordinate measuring apparatus The method includes the steps of: providing a set of known forms having respective diameters and defining circularly-shaped or circular-segment shaped measurement lines having a predetermined first set of form deviations corresponding to the diameters and to the measurement lines; in several positions or planes (x/y, x/z, y/z) of the coordinate measurement apparatus, scanning, at different speeds, the measurement lines and diameters to obtain a second set of form deviations; comparing the first set of form Deviations and the second set of form deviations to each other to obtain a set of corrective values (K1, K2 ... Kn) and storing the set of corrective values (K1, K2 ... Kn); and, mathematically combining the set of corrective values (K1, K2, ... Kn) with measured values (M1, M2 ... Mn) on the known forms when making subsequent measurements of circularly-shaped contours of the workpiece with the coordinate measuring apparatus.

Circularly-shaped or circular segment-shaped measurement lines of different diameter and precisely known forms can be scanned at different speeds in several positions or planes of the measuring region of the coordinate measuring apparatus. In this way, the above-described error influences are reliably detected and the measured form deviations are stored specific to the apparatus in the form of corrective values. These corrective values can then be made actual in the course of a recalibration. In this way, it is possible, for subsequent coordinate measurements of circularly-shaped contours (for example, cylindrical workpieces) to take into account the corrective values with the measurement values of the apparatus In this way, when making form measurements with a coordinate measuring apparatus, measurement accuracies are attainable which can be compared to those achieved with conventional form measurement apparatus.

In special cases specific to an apparatus, it can be necessary to scan measurement lines in positive and negative peripheral directions and to record the corrective values additionally in dependence upon the peripheral direction and to store the same in order to achieve a high accuracy of measurement. It has been shown that the superposition of measurement errors of higher order is dependent also, to a low percentage, upon the peripheral direction of the measurement.

Often, different filters are placed over the measurement values in function-orientated evaluation of form measurements. For this reason, it is advantageous to fold the measured form deviations with different filter functions and to store the same in dependence upon the selected filter.

In order to reduce the number of corrective values to be stored, it can be advantageous to store the measured form deviations in sections so that, for each case, only an individual corrective value is stored for a part-circular segment of the measurement line. Additional measured values for the individual measurement points within a component circular segment can be interpolated, for example, from the stored corrective values for adjacent part circular segments. In this way, the situation is avoided that the limits of the sector allocation are imaged in a form plot after taking into account the corrective values.

With respect to an ease of measurement as high as possible, it is furthermore advantageous to store the corrective values in datasets which are parameterized in accordance with specific measuring tasks. It is then, for example, possible, with the aid of suitable software programs, and before the start of the measurements on a workpiece, to compare the inputted parameters, which describe the measurement task, to the file name in which the corresponding corrective values are stored and to signalize the availability of corrective values adapted to the measuring task. In practice, the software, in the manner of an expert system, displays or suggests, for the particular measurement task, the described corrections of residual errors so that the user can select whether to make corrections or not.

Furthermore, it has been shown that it is advantageous to utilize the correction only when the quotient of the diameter of the cylindrical workpiece, which is to be measured, and the scanning speed lies in a specific range, namely, approximately between 4 s and 20 s. The above-mentioned residual errors are of no consequence when larger diameters are scanned at relatively slow speeds. On the other hand, when scanning smaller diameters at higher speed, unsystematic errors occur increasingly which can no longer be corrected in the manner described.

BRIEF DESCRIPTION OF THE DRAWINGS

The invention will now be described with respect to the drawings wherein.

DESCRIPTION OF THE PREFERRED EMBODIMENTS OF THE INVENTION

Figure 1:
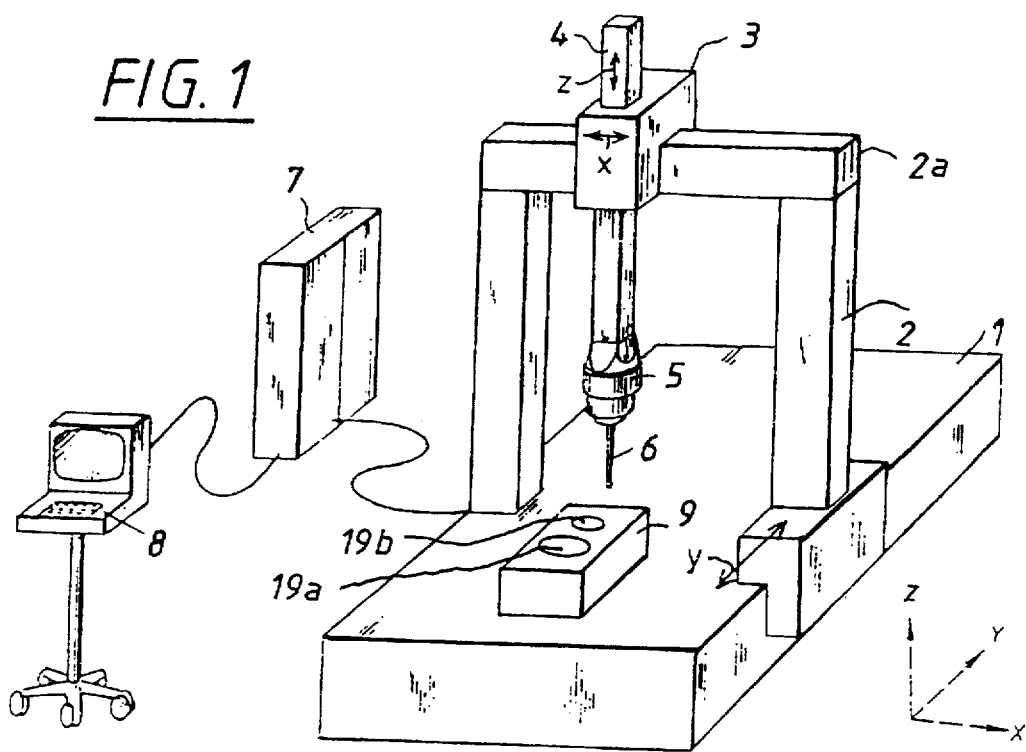
FIG. 1 is a schematic showing the assembled coordinate measuring apparatus of the portal type.

The coordinate measuring apparatus shown in FIG. 1 is of the portal type and comprises a machine table 1 which supports a portal 2 movable horizontally thereon in the y direction. The portal 2 supports a so-called transverse sled 3 guided on the portal transverse member 2a in the x direction. The measuring arm 4 is suspended in the transverse sled 3 in the vertical z direction. The probe head 5 with the probe pin 6 is suspended on the measuring arm 4. The control unit of the coordinate measuring apparatus is identified by reference numeral 7 and the computer by reference numeral 8.

If one wants to execute highly precise form measurements with such an apparatus 7 on the circularly-shaped geometric elements (19a, 19b) of a workpiece 9, then it is necessary to also consider the influence of residual errors in addition to the measuring errors caused by elastic deformation. The elastic deformation can, for example, be the deformation of the measuring arm 4 under the influence of the changing accelerating forces occurring during scanning of the circularly-shaped geometric elements. The residual errors to be considered are listed below as items (1) to (4).

(1) The controller in the probe head 5 holds the measuring force constant when traveling over the circularly-shaped contours (19a, 19b). The controller cannot adequately follow the form changes at higher speeds and this controller performance is reflected in the measurement result.

(2) Residual errors of higher order result because of the centrifugal forces and acceleration forces notwithstanding the correction in accordance with the method disclosed in U.S. Pat. No. 5,594,668, and incorporated herein by reference.

(3) A drag error occurs in dependence upon the following: bending of the probe pin for defined measuring force, friction between probe ball and workpiece and the scanning speed. That is, the location of the probe ball is not coincident to the coordinate measurement values read out from the scales of the apparatus. This drag error is dependent upon also the direction of the scanning movement.

(4) A superposition (vibrations and surges) of the above-mentioned influences.

The residual errors based on the above influences are eliminated as described below.

Figure 2:
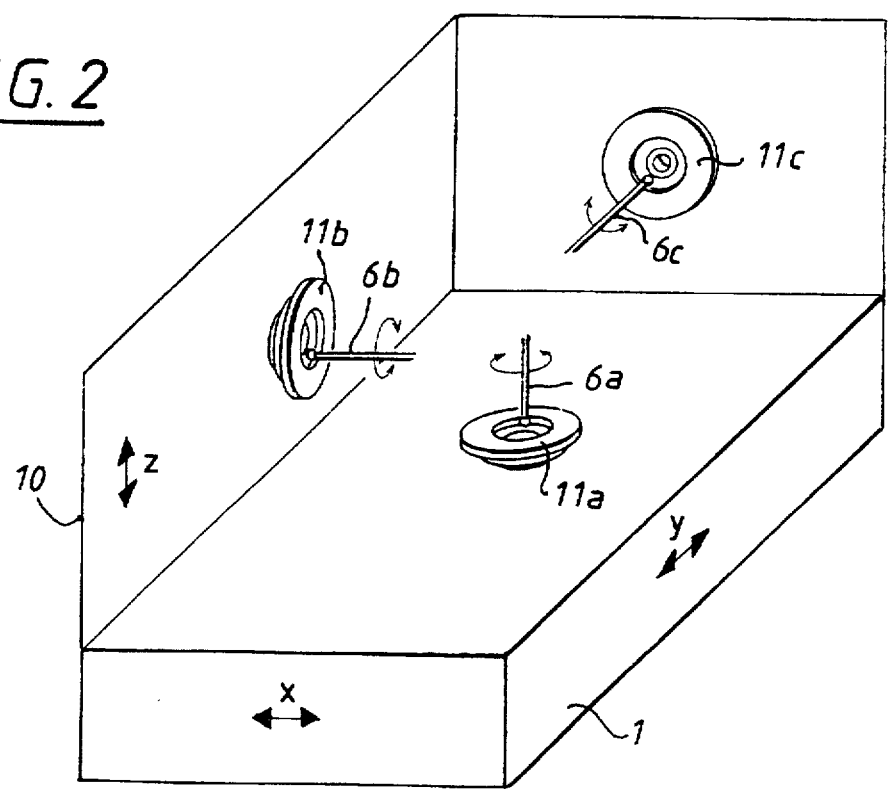
FIG. 2 shows the measurement volume of the coordinate measuring apparatus of FIG. 1 wherein three stacks of gauges are shown fixed in different positions.
Figure 3:
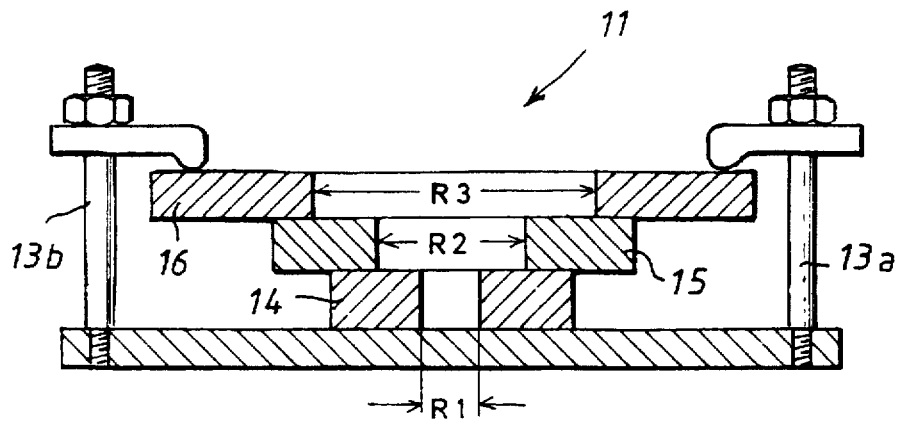
FIG. 3 shows, in section, one of the gauge stacks of FIG. 2.

In FIG. 2, three stacks of several separately calibrated and certified standards are shown in three different positions in the measuring region 10 of the coordinate measuring apparatus. The standards here are gauge rings having very slight form deviations. The stacks are so aligned that the common axis of these rings is, in each case, aligned along one of the three measurement axes (x, y, z). In the example described, and as shown in FIG. 3, three such rings (14, 15, 16) with different diameters (D1, D2, D3) are attached, as free from deformation as possible, to a common plate. The rings are attached with the and of suitable clamping means (13a, 13b) shown simplified in FIG. 3. This formation can be fixed in the three positions in the measuring region 10 with the aid of positioning means (not shown). Alternatively, it is also possible to provide a special test body made for this purpose. The test body has bores of different diameters in one or in all three orthogonal planes.

Thereafter, the rings are scanned with a correspondingly aligned probe (6a, 6b, 6c) on the probe head 5 at different scanning speeds (Vsc) and the measured values obtained are stored. In this measurement operation, the corrective methods, which have up to now been available, are included and are active. With these corrective methods, the following have been corrected in accordance with the method described in the above-identified U.S. Pat. No. 5,594,668: the static deviations of the guides, the probe bending and the dynamic deviations.

Figure 4:
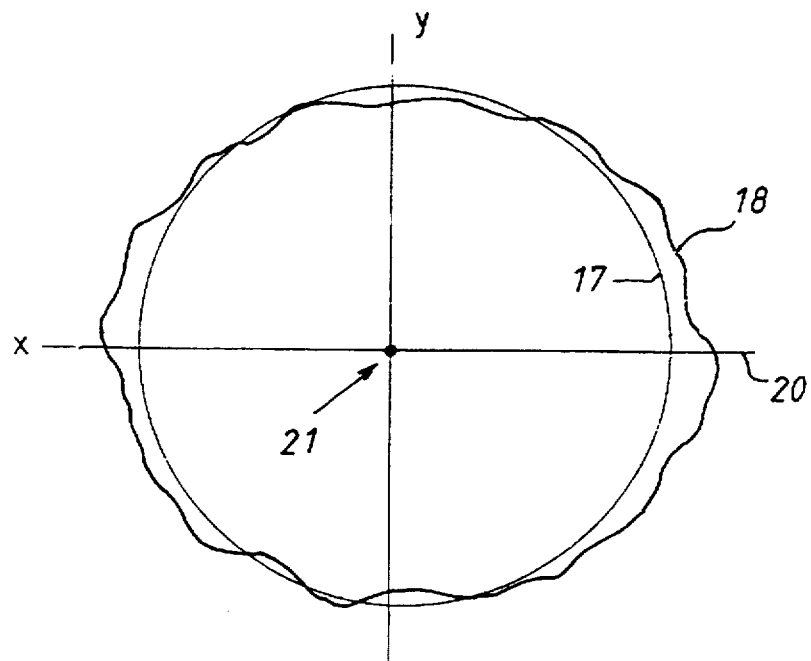
FIG. 4 is a diagram showing the form deviation of a gauge ring measured with the coordinate measuring apparatus and measured with a reference device; and, FIG. 5 is a detail enlarged view showing the form deviations of FIG. 4 for two circular segments corresponding to respective sectors (S1, S2).

The above-described residual errors of the coordinate measuring apparatus are superposed on the actual form of the calibrated standards in the measuring result. This situation is shown in FIG. 4. There, the form deviation 17 is contrasted with the form deviation 18 in a polar coordinate diagram. For a specific diameter and a specific speed, the form deviation 17 is measured with a reference apparatus such as a special form measuring apparatus and the form deviation 18 is measured with a coordinate measuring apparatus. FIG. 4 shows, for example, a systematic increase of the form deviation because of an elliptical distortion in the direction of an axis 20 and a superposition of different measurement errors.

Thereafter, corrective values are generated by comparing the form deviation 18 and the form deviation 17 and storing the corrective values in data files. As mentioned above, the form deviation 18 is measured with the coordinate measuring apparatus and the form deviation 17 is measured with the reference apparatus. The reference point 21 is formed by the common center point of the two compensating circles which are placed over the form deviations (17, 18) in accordance with the Gaussian error compensating method.

The following are contained coded in the dataset of the corrective data: scanning speed, diameters (D1, D2, D3) of the rings, the position of the rings in the three planes (x/y, x/z, y/z) and the filter with which the measured values were filtered. In this way, the corrective data is already parameterized and this parameterization is apparent from the file name of the corrective data. Accordingly, the data file XY020V01F050 means that in this data file, corrective values for a ring lying in the xy-plane are stored having a diameter of 20 mm. This ring was scanned at a speed of Vsc=1 mm/sec. The measured values were smoothed by a filter having the limit frequency of 50 fluctuations/periphery.

Figure 5:
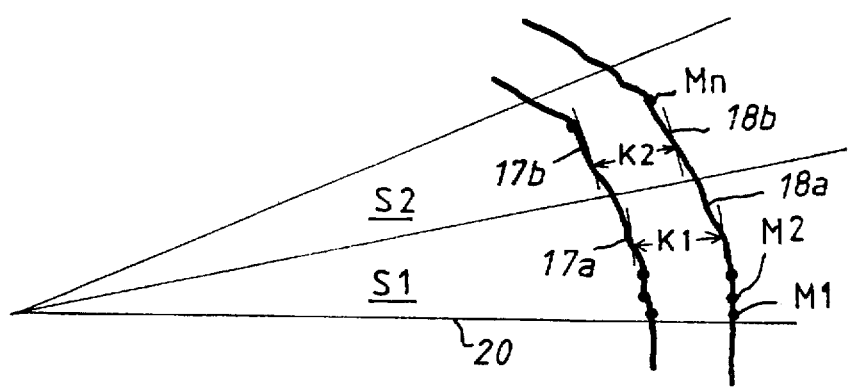

The data files themselves have the structure of two-column tables. In one column, the angular position of the particular measurement point is referred to the axis (x, y) of the plane in which the ring lies. In the other column, the corresponding corrective value is located which results from the difference of the form deviation 18 determined by the coordinate measuring apparatus and the form deviation 17 determined with the reference apparatus. These corrective values must, however, not be determined for each individual measuring point (M1, M2 . . . Mn). In lieu thereof, and as shown in FIG. 5, it is also possible to subdivide the circle of the measured ring into several sectors (for example 150 sectors) and, for each sector, to determine a mean corrective value (K1, K2) and to store the same referred to the sector number (S1, S2) or to the corresponding angular range. The subdivision of the sectors, and thereby the number of the corrective values, is selected corresponding to the wavelength constant of the selected filter. However, any desired combination from the number of corrective values and the filters used is possible.

In the Table 1 which follows, corrective values referred to 120 sectors of a circle are listed as an example. The form deviation and the form plot have been determined with a filter 50 fluctuations/periphery.

TABLE 1

| Corrective Data File XY020V01F050 | |
| --- | --- |
| Circular periphery/° | Corrective value/μm |
| 0 | −0.20 |
| 3 | −0.25 |
| 6 | −0.30 |
| 9 | −0.35 |
| 12 | −0.45 |
| . | . |
| 357 | −0.10 |

As described above, a multiplicity of data files having corrective data is generated. The number of the data files is dependent upon the number of different planes, the scanning speeds (VSc), the number of different measured ring diameters and the number of the filters used. However, it is not necessary to permutate all possibilities of these four parameters with each other. It is however advantageous to limit to a few combinations with respect to the diameter D and the scanning speed VSc. These combinations are characterized in that the quotient D/VSc lies in the range of approximately 4 s to 20 s. In this way, a purposeful useful range is delimited for the method.

If the peripheral direction of the scanning measurement is considered, then the number of datasets increases by a factor of two. The peripheral direction can then be coded into the file name, for example, by the sequence of the axes when identifying the plane xy for a positive peripheral direction, yx for a negative peripheral direction or by adding P(+) or P(−) at the end of the file name.

After the described datasets are established with their corrective values (K1, K2), "real" workpieces can be measured with respect to their form with only slight measurement unreliability on the coordinate measuring apparatus shown in FIG. 1. For this purpose, the software of the coordinate measuring apparatus is so set up that the user is informed as to the presence of a corresponding dataset having corrective values as soon as the selected measuring task shows that circularly-shaped, cylindrical or spherically-shaped geometric elements are to be measured with the diameter and the scanning speed lying in the doubtful range. The user can then decide whether to apply the corrective method. If the user decides to use this corrective method, then the measured values which the coordinate measuring apparatus supplies, are combined mathematically, inter alia, with the corrective values (K1, K2 . . . ) and a similar result is provided which would have been obtained by measuring on a special form measuring apparatus.

It is understood that the foregoing description is that of the preferred embodiments of the invention and that various changes and modifications may be made thereto without departing from the spirit and scope of the invention as defined in the appended claims.

What is claimed is:

1. A method of making coordinate measurements on a workpiece with a coordinate measuring apparatus, the method comprising the steps of:

providing a set of known forms having respective diameters and defining circularly-shaped or circular-segment shaped measurement lines having a predetermined first set of form deviations corresponding to said diameters and to said measurement lines;

in several positions of said coordinate measurement apparatus scanning, at different speeds, said measurement lines and diameters to obtain a second set of form deviations;

comparing said first set of form deviations and said second set of form deviations to each other to obtain a set of corrective values (K1, K2 . . . Kn) and storing said set of corrective values (K1, K2 . . . Kn);

mathematically combining said set of corrective values (K1, K2, . . . Kn) with measured values (M1, M2 . . . Mn) on said known forms when making subsequent measurements of circularly-shaped contours of said workpiece with said coordinate measuring apparatus; and, said corrective values (K1, K2 . . . Kn) being convoluted with various filter functions and stored in dependence upon the selected filter function.

2. The method of claim 1, wherein said measurement lines are scanned in the positive and negative peripheral directions and said corrective values (K1, K2 . . . Kn) are additionally stored in dependence upon said peripheral directions.

3. The method of claim 1, wherein said corrective values (K1, K2 . . . Kn) are stored in datasets which are parameterized in accordance with predetermined measuring tasks.

4. The method of claim 3, further comprising the steps of comparing the parameters (D, Vac) defining the measurement task to the datasets in advance of making coordinate measurements on a circularly-shaped contour (19a, 19b), and, signalizing the presence of corrective values adapted to the measuring task.

5. The method of claim 1, further comprising the step of determining and storing said corrective values (K1, K2 . . . Kn) for a predetermined range (A) of the quotient (D/Vsc) of the diameter (D) of the measurement line of each of the forms and the scanning speed (Vsc).

6. The method of claim 5, wherein said range (A) lies between 4 s and 20 s.

7. A method of making coordinate measurements on a workpiece with a coordinate measuring apparatus, the method comprising the steps of:

providing a set of known forms having respective diameters and defining circularly-shaped or circular-segment shaped measurement lines having a predetermined first set of form deviations corresponding to said diameters and to said measurement lines;

in several positions of said coordinate measurement apparatus, scanning, at different speeds, said measurement lines and diameters to obtain a second set of form deviations;

comparing said first set of form deviations and said second set of form deviations to each other to obtain a set of corrective values (K1, K2 . . . Kn) and storing said set of corrective values (K1, K2 . . . Kn);

mathematically combining said set of corrective values (K1, K2, . . . Kn) with measured values (M1, M2 . . . Mn) on said known forms when making subsequent measurements of circularly-shaped contours of said workpiece with said coordinate measuring apparatus; and, said corrective values (K1, K2 . . . Kn) being stored for respective sectors (S1, S2 . . . Sn) corresponding to respective segments of the measurement line.

8. The method of claim 7, further comprising the step of interpolating additional corrective values from each two mutually adjacent ones of said stored corrective values (K1, K2 . . . Kn) for individual ones of said measured values (M1, M2 . . . Mn).

9. The method of claim 7, wherein said measurement lines are scanned in the positive and negative peripheral directions and said corrective values (K1, K2 . . . Kn) are additionally stored in dependence upon said peripheral directions.

10. The method of claim 7, wherein said corrective values (K1, K2 . . . Kn) are stored in datasets which are parameterized in accordance with predetermined measuring tasks.

11. The method of claim 10, further comprising the steps of: comparing the parameters (D, Vac) defining the measurement task to the datasets in advance of making coordinate measurements on a circularly-shaped contour (19a, 19b); and, signalizing the presence of corrective values adapted to the measuring task.

12. The method of claim 7, further comprising the step of determining and storing said corrective values (K1, K2 . . . Kn) for a predetermined range (A) of the quotient (D/Vsc) of the diameter (D) of the measurement line of each of the forms and the scanning speed (Vsc).

13. The method of claim 12, wherein said range (A) lies between 4 s and 20 s.

14. The method of claim 7, wherein said corrective values (K1, K2 . . . Kn) are convoluted with various filter functions and stored in dependence upon the selected filter function.

15. A method of making coordinate measurements on a workpiece with a coordinate measuring apparatus, the method comprising the steps of:

providing a set of known forms having respective diameters and defining circularly-shaped or circular-segment shaped measurement lines having a predetermined first set of form deviations corresponding to said diameters and to said measurement lines;

in several positions of said coordinate measurement apparatus, scanning, at different speeds, said measurement lines and diameters to obtain a second set of form deviations;

comparing said first set of form deviations and said second set of form deviations to each other to obtain a set of corrective values (K1, K2 . . . Kn) and storing said set of corrective values (K1, K2 . . . Kn);

mathematically combining said set of corrective values (K1, K2, . . . Kn) with measured values (M1, M2 . . . Mn) on said known forms when making subsequent measurements of circularly-shaped contours of said workpiece with said coordinate measuring apparatus; and, said corrective values (K1, K2 . . . Kn) being stored in datasets which are parameterized in accordance with predetermined measuring tasks.

16. The method of claim 15, further comprising the steps of: comparing the parameters (D, Vac) defining the measurement task to the datasets in advance of making coordinate measurements on a circularly-shaped contour (19a, 19b); and, signalizing the presence of corrective values adapted to the measuring task.

17. The method of claim 15, further comprising the step of determining and storing said corrective values (K1, K2 . . . Kn) for a predetermined range (A) of the quotient (D/Vsc) of the diameter (D) of the measurement line of each of the forms and the scanning speed (Vsc).

18. The method of claim 17, wherein said range (A) lies between 4 s and 20 s.

19. A method of making coordinate measurements on a workpiece with a coordinate measuring apparatus, the method comprising the steps of:

providing a set of known forms having respective diameters and defining circularly-shaped or circular-segment shaped measurement lines having a predetermined first set of form deviations corresponding to said diameters and to said measurement lines;

in several positions of said coordinate measurement apparatus, scanning, at different speeds, said measurement lines and diameters to obtain a second set of form deviations;

comparing said first set of form deviations and said second set of form deviations to each other to obtain a set of corrective values (K1, K2 . . . Kn) and storing said set of corrective values (K1, K2 . . . Kn);

mathematically combining said set of corrective values (K1, K2, . . . Kn) with measured values (M1, M2 . . . Mn) on said known forms when making subsequent measurements of circularly-shaped contours of said workpiece with said coordinate measuring apparatus; and, determining and storing said corrective values (K1, K2 . . . Kn) for a predetermined range (A) of the quotient (D/Vsc) of the diameter (D) of the measurement line of each of the forms and the scanning speed (Vsc).

20. The method of claim 19, wherein said range (A) lies between 4 s and 20 s.

* * * * *